United States Patent
Koerwien et al.

(10) Patent No.: US 7,056,402 B2
(45) Date of Patent: Jun. 6, 2006

(54) TECHNICAL PRODUCTION METHOD, TENSION MODULE AND SEWING MATERIAL HOLDER FOR CREATING TEXTILE PREFORMS FOR THE PRODUCTION OF FIBRE-REINFORCED PLASTIC COMPONENTS

(75) Inventors: Thomas Koerwien, Taufkirchen (DE); Ernst-Joachim Bauer, Bad Aibling (DE); Juergen Filsinger, Aying (DE)

(73) Assignee: EADS Deutschland GmbH, Munich (DE)

( * ) Notice: Subject to any disclaimer, the term of this patent is extended or adjusted under 35 U.S.C. 154(b) by 205 days.

(21) Appl. No.: 10/432,197

(22) PCT Filed: Nov. 16, 2001

(86) PCT No.: PCT/EP01/13274

§ 371 (c)(1),
(2), (4) Date: Oct. 21, 2003

(87) PCT Pub. No.: WO02/42044

PCT Pub. Date: May 30, 2002

(65) Prior Publication Data

US 2004/0074587 A1    Apr. 22, 2004

(30) Foreign Application Priority Data

Nov. 21, 2000  (DE) ................................ 100 57 620

(51) Int. Cl.
    *B32B 7/08*  (2006.01)
(52) U.S. Cl. .................. 156/93; 156/227; 156/242; 156/245; 156/307.3; 264/241; 264/257; 264/258; 112/412; 112/440; 112/470.06; 112/470.13; 112/475.01

(58) Field of Classification Search .................. 156/93; 112/412, 440, 470.06, 470.13, 475.01; 264/241
See application file for complete search history.

(56) References Cited

U.S. PATENT DOCUMENTS

| 4,786,343 A | * | 11/1988 | Hertzberg ..................... 156/93 |
| 5,789,061 A |   | 8/1998  | Campbell et al. |
| 5,915,317 A |   | 6/1999  | Thrash et al. |

FOREIGN PATENT DOCUMENTS

| DE | 19922799 A1 | 11/2000 |
| DE | 19952443 A1 | 5/2001  |
| EP | 1031406 A1  | 8/2000  |
| GB | 2191443 A   | 12/1987 |

* cited by examiner

*Primary Examiner*—Richard Crispino
*Assistant Examiner*—Chris Schatz
(74) *Attorney, Agent, or Firm*—Crowell & Moring LLP

(57) ABSTRACT

A ready-made technical process for manufacturing fiber-reinforced plastic building components envisions the use of a link and, optionally, a flange and/or a base using textile blanks as starting material. Initially, at least two layers of the textile blanks are positioned vis-á-vis one another, clamped in and undergo a first sewing-up process. A preform is fashioned featuring the architecture of the product that is to be manufactured, and subsequently the preform is infiltrated with resin in order to realize the plastic building component. A tension module realizes a flange on a textile preform and a sewing material holder receives a textile preform in order to implement the steps referred to.

7 Claims, 11 Drawing Sheets

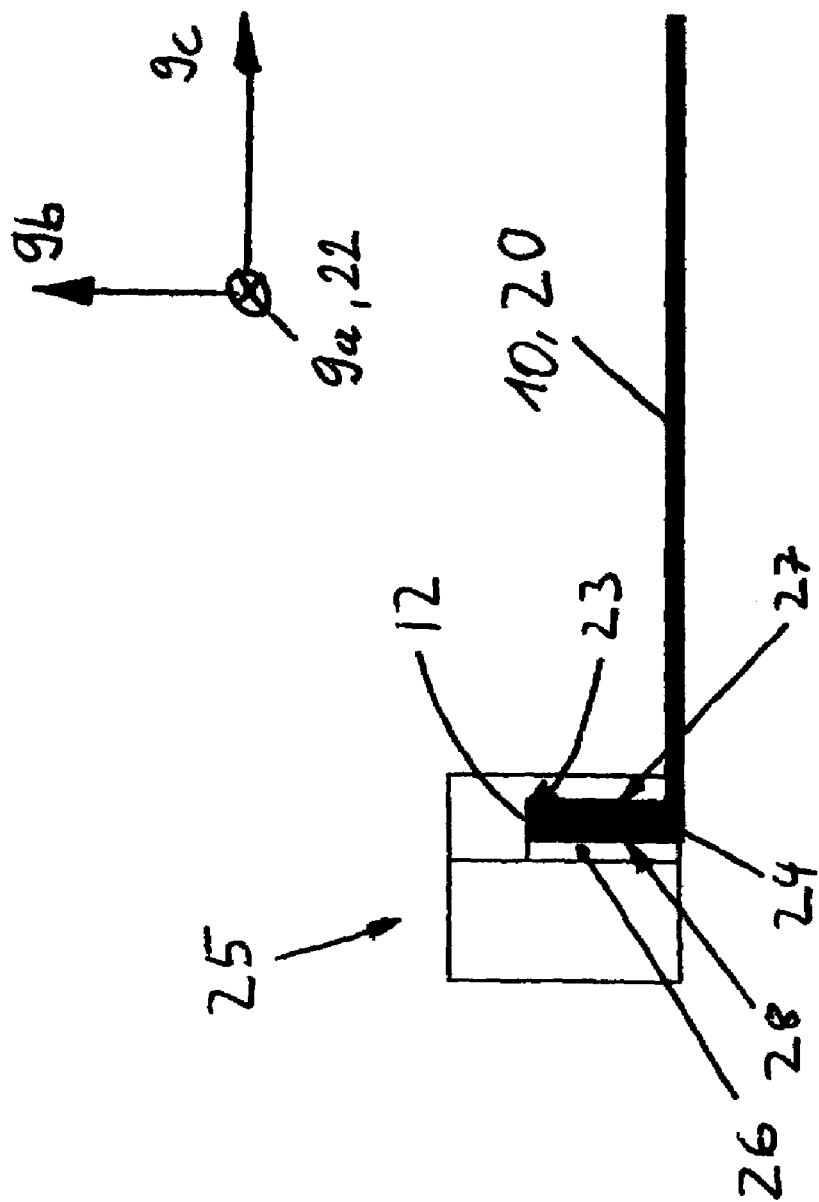

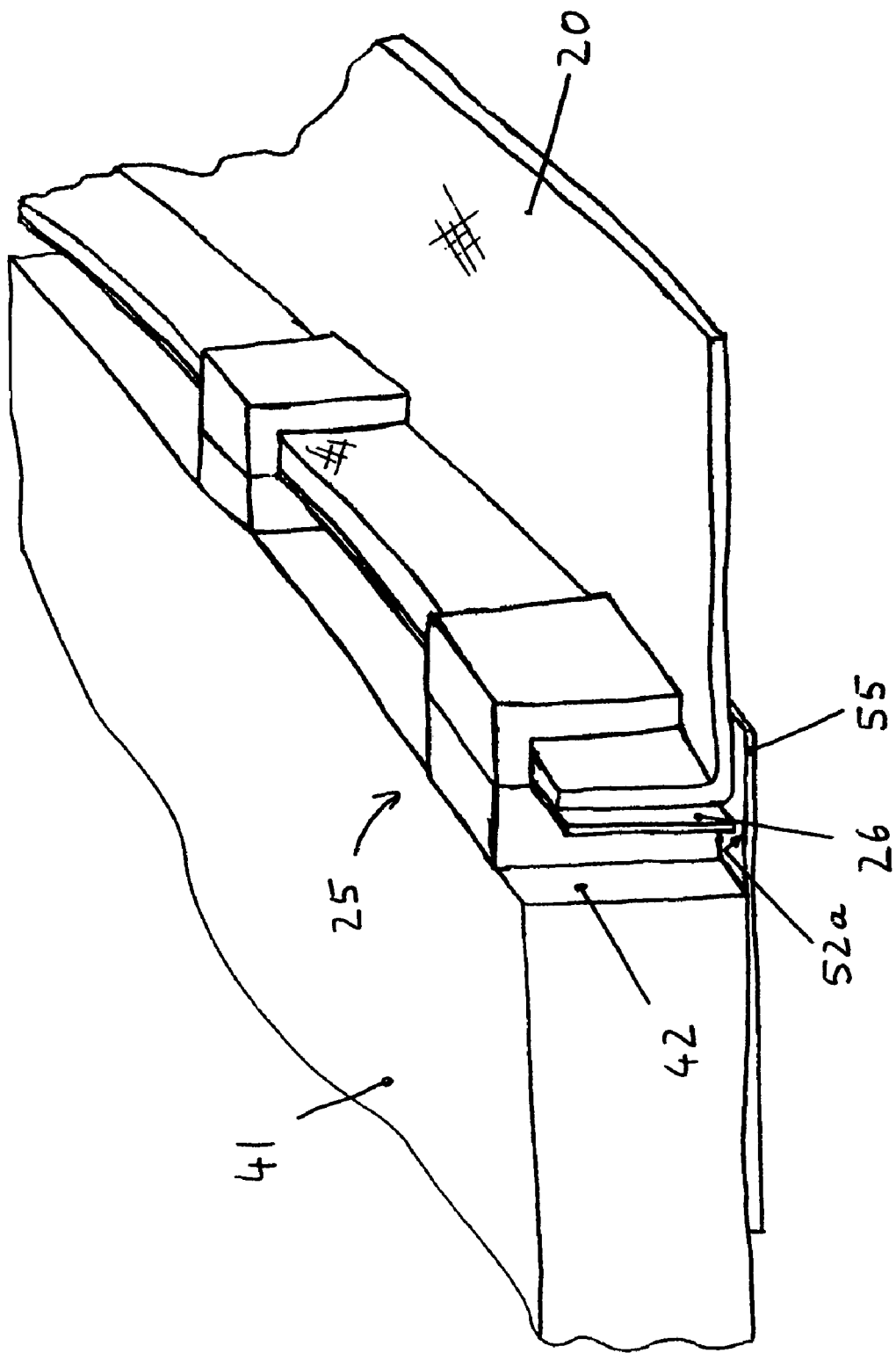

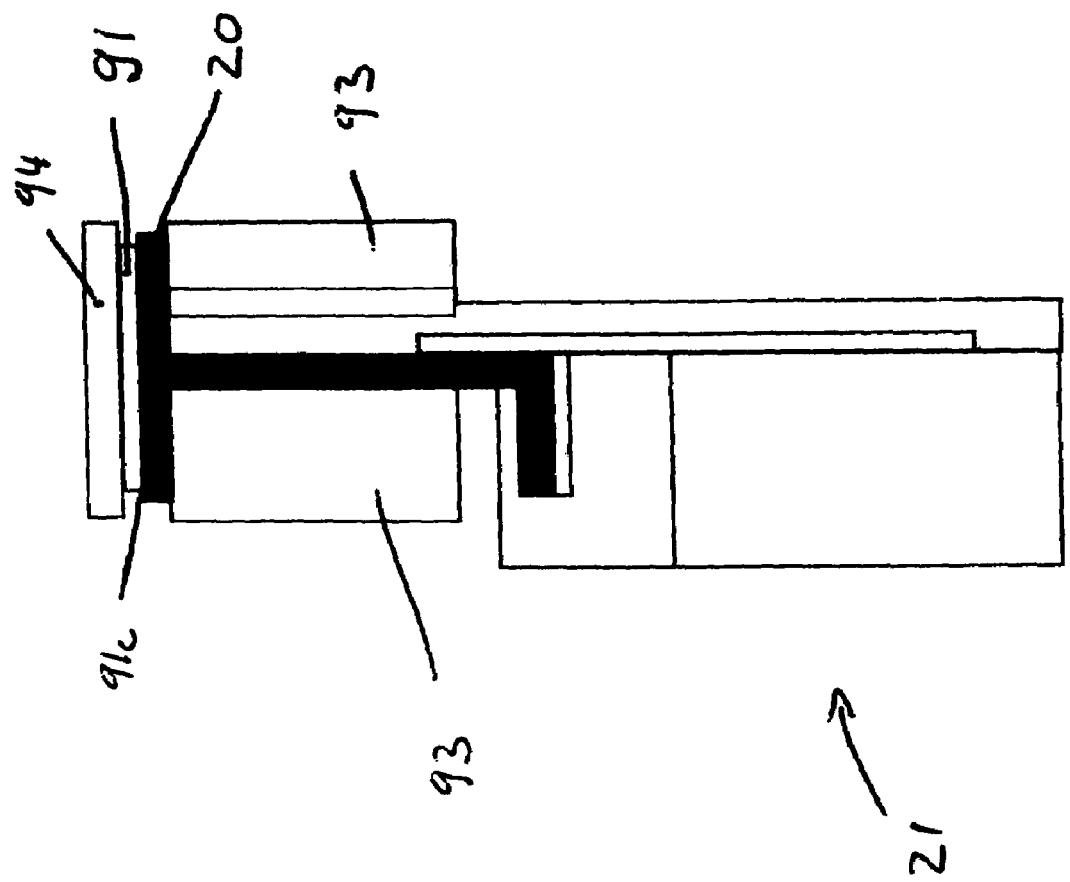

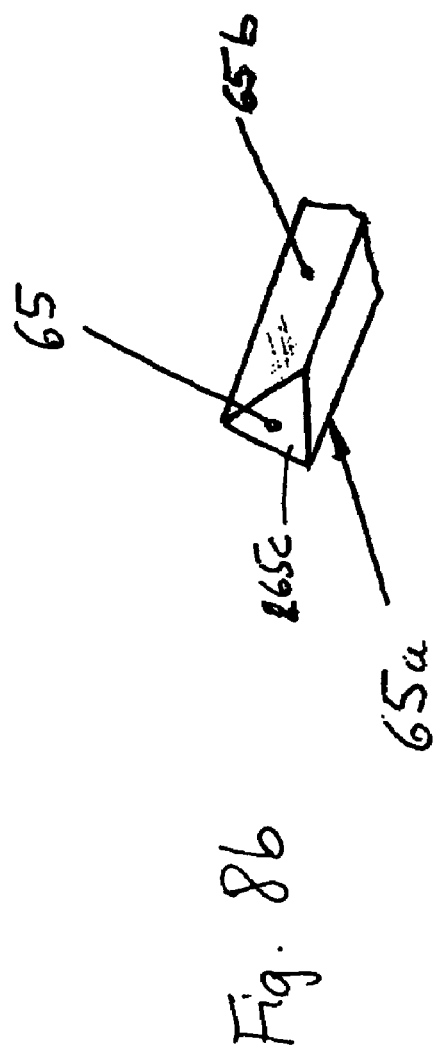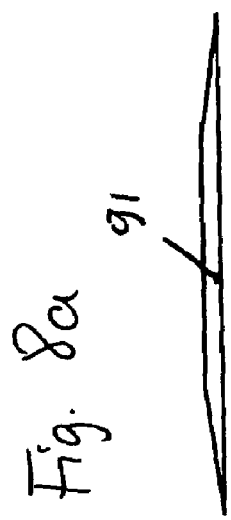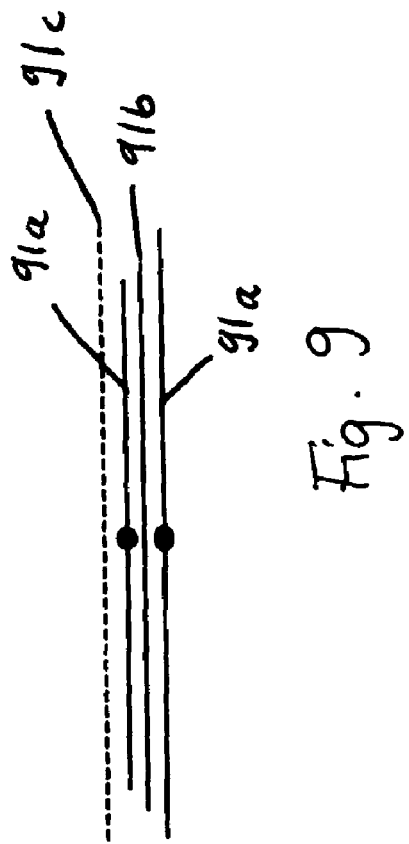

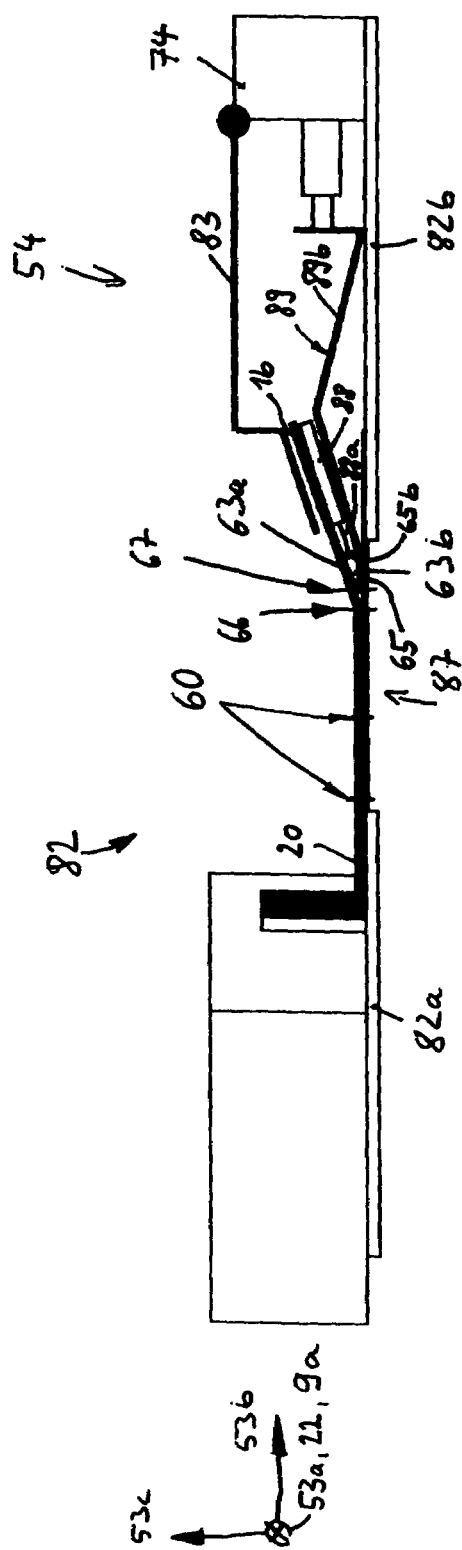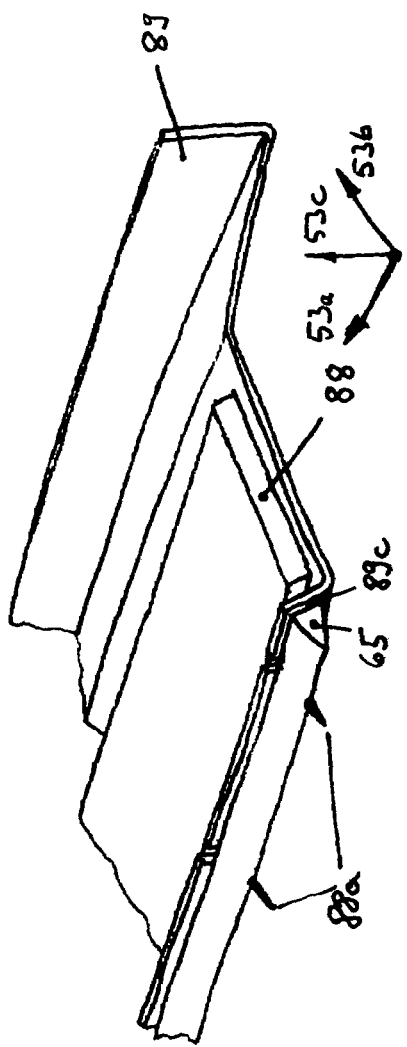
Fig. 10a
Fig. 10b

TECHNICAL PRODUCTION METHOD, TENSION MODULE AND SEWING MATERIAL HOLDER FOR CREATING TEXTILE PREFORMS FOR THE PRODUCTION OF FIBRE-REINFORCED PLASTIC COMPONENTS

The present invention relates to a ready-made technical process for modeling textile preforms for the manufacture of fiber-reinforced plastic building components using textile blanks as starting material in accordance with the preambles of the method claims. The invention further relates to a tension module for realizing a flange on a textile preform as well as a sewing material holder for receiving a textile preform.

Cost-efficient textile preforms of reproducible quality are envisioned for the manufacture of fiber-reinforced plastic building components made of textile semi-finished products that approximate, for the most part, the final contours of the plastic building component (near net shape). The textile preforms are fashioned by way of at least one clutch, woven fabric or knitted fabric, i.e. generally a textile, two-dimensional architecture. The preforms are used, for example, for manufacturing integrally reinforced planking fields.

Methods for the quality manufacture of the preforms are known from the general prior art; they involve straight and curved reinforcement profiles with variable flange, link and base dimensions. A number of profile types can be manufactured using these methods.

The manufacture of fiber-reinforced plastic building components from textile semi-finished products in accordance with the prior art provides that said components are, utilizing techniques of the textile industry, woven, braided, knitted and customized, i.e. cut to size, sewed up and, in a separate processing step, infiltrated with resin for further processing. But the minimal component rigidity of braided structures, for example, has proved disadvantageous. Moreover, complex structures with locally arranged thickenings and changeable cross-sectional profile dimensions are difficult to manufacture requiring extensive manual labor. Reproducibility of constantly reliable quality can only be achieved with much effort and expense. In order to be able to reproducibly manufacture textile preforms, it is necessary to make the corresponding arrangements for taking precautions that will protect the textile handling from irreversible distortions while going through the individual processing steps. The elastic and reversible propensity for distortions that textiles possess compromises the modeling processing steps. Consequently, for all operations, it must be ensured that the textiles are processed in the absence of any tensile force acting upon them, i.e. they are manufactured and processed free of the influence of external forces.

An object of the invention is to provide a ready-made technical process that will allow for the production of a large variety of preforms.

A further object of the invention is to provide apparatuses for implementing the ready-made technical processes that make the production of a large variety of preforms possible.

These objects are achieved with the characteristics of the independent patent claims. Further embodied examples are reflected in the claims depending on these independent claims.

Using a process method according to the invention, it is possible to manufacture a number of cross-sectional geometries with curved and straight designs.

Moreover, reinforcement layers are incorporated in any position; modifications of the cross-sectional dimensions are realized, and reproducible quality of the preforms is guaranteed with this method.

Technology makes it possible to build three-dimensional preforms comprised of several layers of different textiles, thereby establishing the elastic and mechanical properties, to incorporate reinforcement layers at any desired location, to change the cross-sectional dimensions at any desired position, to create a curve in the longitudinal direction and to reproducibly process two-dimensional textiles into three-dimensional textile preforms.

A further advantage of the invention is that preforms in straight and curved shapes can be manufactured with reproducible quality featuring a number of cross-sectional forms. Another advantage of the invention is that it is possible to realize locally arranged thickenings and changes of the cross-sectional dimensions.

The invention will be described in more detail by way of the enclosed Figures.

BRIEF DESCRIPTION OF THE DRAWINGS

FIG. 3a is a cross-section of an example of the tension module according to the invention, FIG. 5b is a perspective-specific detail representation of a clamping rail that is applied to a form element as an example of a tension module including a section of a clamped-in preform, FIG. 7 is a schematic arrangement of the apparatuses represented in FIG. 5a including stiffening elements in order to support the base area of the preform, FIG. 8a is a cross section of an example of a stiffening element for the base area of the preform, FIG. 8b is an example of a spacer for modeling the base area of the preform, FIG. 9 is a schematic representation of how an example of the stiffening element in accordance with FIG. 8a is built, FIG. 10 is a cross-sectional representation of a sewing material holder that is envisioned for preforms, which are modeled linearly in the longitudinal direction, including a tension module and a holding device.

DETAILED DESCRIPTION OF THE INVENTION

Figure 1:
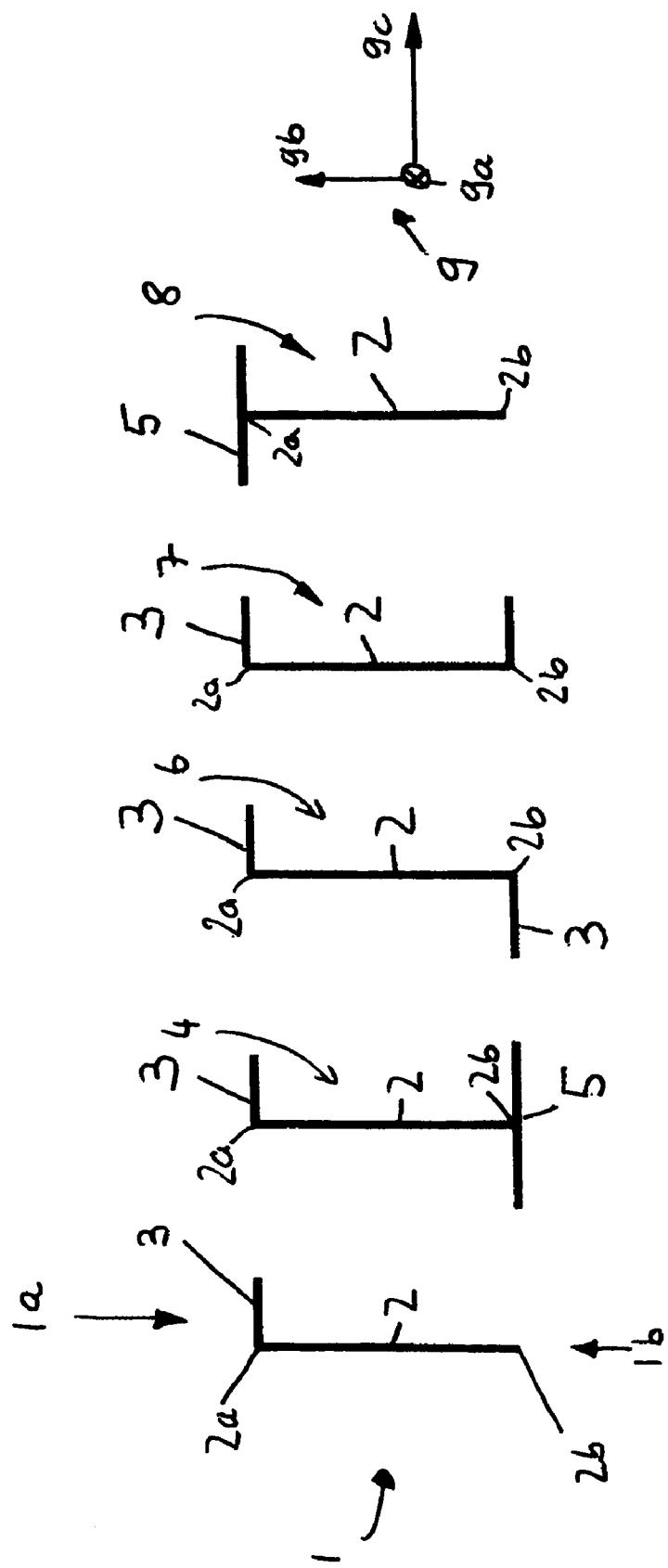
FIG. 1a is a representation of an example of a textile preform that can be manufactured in accordance with the method according to the invention or of a sub-preform shown from a cross-sectional perspective and comprising a link and a flange.
FIG. 1b is a further example of a profile shape that comprises, in addition, a base in order to form an LZ-shaped profile.
FIG. 1c is a further example of a profile shape that is realized as a Z-shaped profile.
FIG. 1d is a further example of a profile shape comprised of two flanges that are connected to each other by way of a link.
FIG. 1e is a further example of a profile form comprised of a link and a base.

A method according to the invention is used to manufacture plastic building components that can be curved or straight in their longitudinal direction and that can have an angular profile, in particular, profile shapes as shown in the FIGS. 1a, 1b, 1c, 1d, 1e. Additional forms can be produced by way of combining the depicted profile shapes. FIG. 1a shows a profile 1 with, in terms of the height extension, a first end area or edge area 1a and a second end area or edge area 1b as well as a first end and a second end with regard to the axial or longitudinal direction (not visible in the representations in FIGS. 1a, 1b, 1c 1d, 1e). The profile 1 features a link 2 with the ends 2a, 2b and a flange 3 on one of its ends 2a or 2b. FIG. 1b shows a profile 4 the link 2 of which also features a flange 3 on its first end 2a and a base 5 on its second end 2b. The profile 6 with the link 2 that is depicted in FIG. 1c features two flanges 3; each of these extends horizontally in an opposite direction, respectively, from either one of the ends 2a, 2b. In the profile 7 in FIG. 1d, the flanges 3 extend in the same direction in relation to each other from the link 2. FIG. 1e depicts a profile 8 featuring only a base 5.

For orientation purposes, a system 9 of coordinates is shown in FIG. 1 that defines the longitudinal direction 9a or the z-direction of the profile 1, its direction of height or y-direction 9b and its direction of width or x-direction 9c.

The flanges 3 and bases 5 can extend in a perpendicular direction or in an angular direction from the respective link 2. The three-dimensional shape of the final product and/or of the preform that is used to manufacture the final product determines the two-dimensional shape of the semi-finished product as well as the course of the seams that fasten the layers of the semi-finished products at suitable locations relative to each other. It is also possible for the products that are to be manufactured to extend in bends or curves or in a straight direction.

Figure 3B:
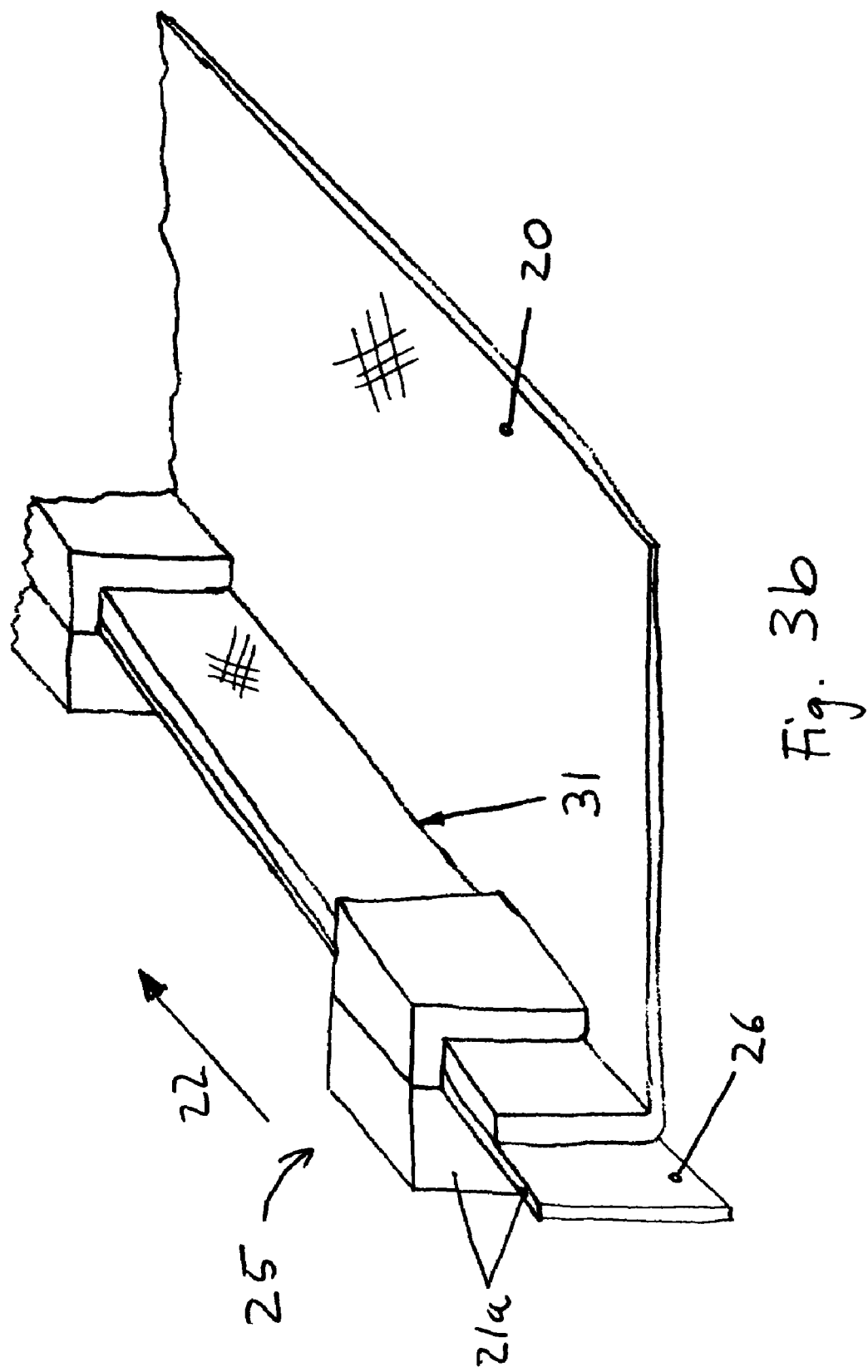
FIG. 3b is a schematic perspective-specific representation of a part of an example of the tension module according to the invention modeled with a flexible clamping rail and a section of a preform that is clamped into said rod.
Figure 4:
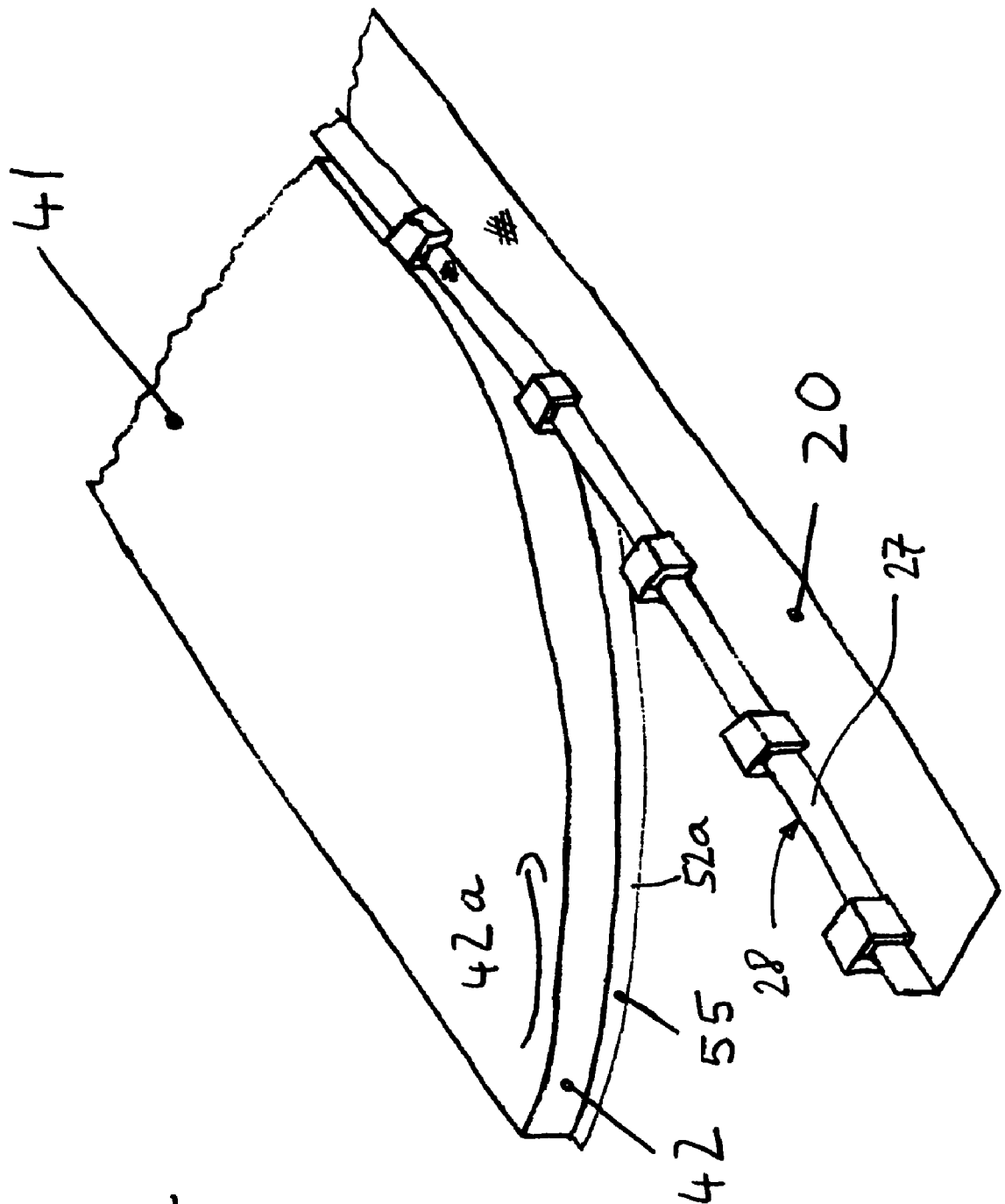
FIG. 4 is a schematic perspective-specific representation of an example of a form element and a tension module that is in part applied to the former, and the tension module is partially applied in order to realize a lengthwise curve of the preform that is to be manufactured.
Figure 5A:
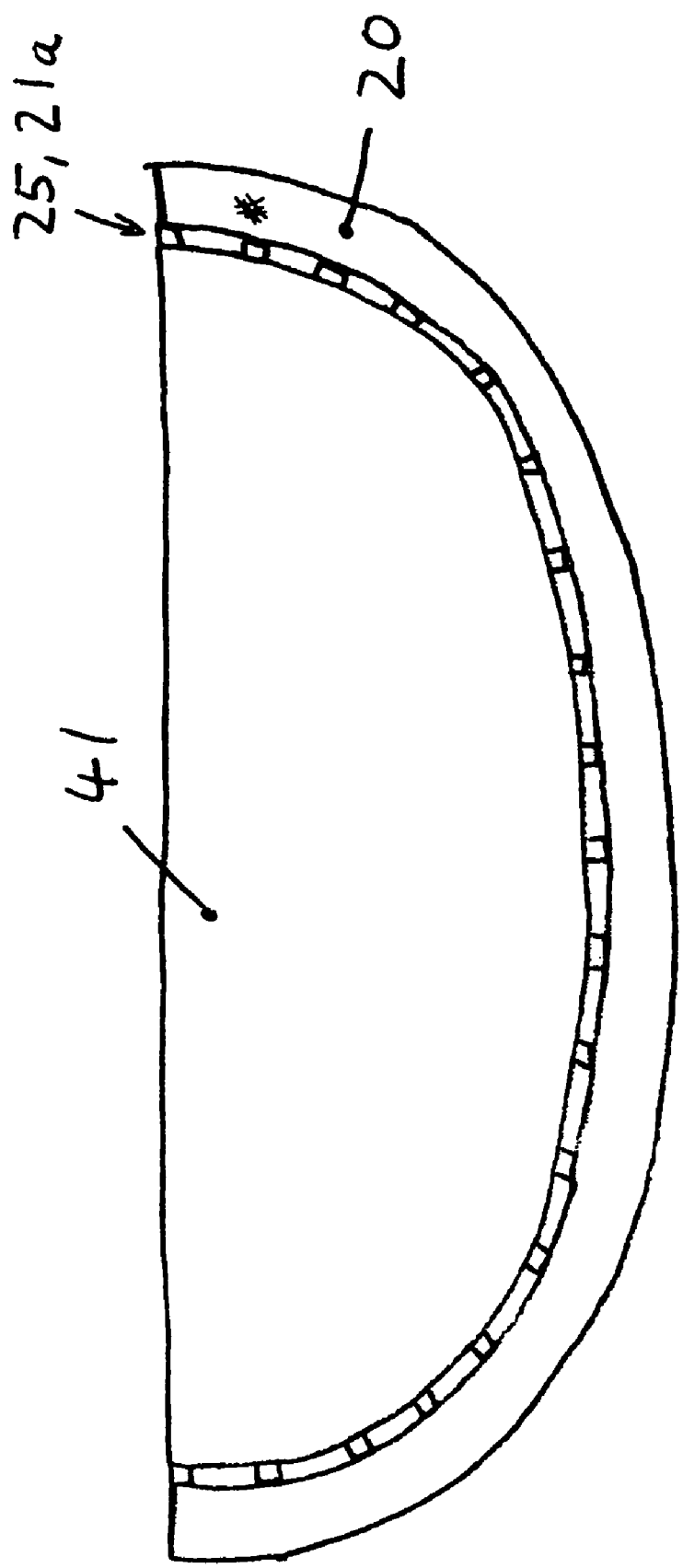
FIG. 5a is a top view of a tension module that is applied to a form element.

A method according to the invention provides that the preform is manufactured from at least two layers of cut-to-size, textile, semi-finished products. These are inserted in a fastening direction (positioning direction), positioned and sewn up in the context of a fastening process in order to fix the at least two layers in place for any subsequent draping steps (FIG. 2); an area that represents an area of relatively minimal deformation on the preform that is to be manufactured is chosen, in particular. For a preform with a flange or base, an area of this type can be, in particular, the area of the link. An area of minimal deformation is an area where re-forming operations will not cause any changes with respect to the fiber orientation. Localized reinforcements, if available, are also inserted as part of this step and provisionally fastened by way of the fastening process. In this way, the semi-finished product becomes a sub-preform or preform 20. A flange 3 is formed by way of a clamping rail (FIGS. 3a and 3b). To achieve a curving of the semi-finished product in its longitudinal direction, the clamping rail is applied to a modeling arc along with the clamped-in sub-preform (FIGS. 4, 5a and 5b). A base 5 is formed by way of turning apart the edges of a part or the sub-preform 20 along a longitudinal line (FIG. 7). After modeling the preform from a sub-preform, provided the preform is not already the sub-preform, the pre-form is infiltrated, e.g. in a corresponding mold, with resin in order to obtain the plastic final product that is to be manufactured.

In their respective starting conditions, the textile blanks or semi-finished products 10 comprise several layers of a textile two-dimensional architecture in the form of clutches, knitted fabrics or woven fabrics. The use of the corresponding textile semi-finished products 10 depends on their draping capacity, i.e. their proneness for incurring deformations of the layers of the preform when distortions and curves are realized on the latter. The textile semi-finished product must allow for refashioning it in such a way that in the end position there will not result any shifts and/or folds in the material that may negatively impact its mechanical properties.

Initially, the textile semi-finished product 10 must be cut into a shape based upon which it is possible to fashion a preform 20 and, consequently, the plastic final product. Preferably, this preform represents the unwound surface of the end product, taking into account the effects caused by draping, e.g. making the corresponding allowances for draping by planning for additional material. The starting form represents layers of a textile semi-finished product used to shape a preform 20 by way of cutting the layers to size and placing them on top of each other and based upon which, for example, the preform that is suitable for the manufacture of the final product is obtained e.g. by way of turning up individual areas of the preform or of areas of individual layers or by way of curving in the longitudinal direction. For this purpose, the textile semi-finished product 10 is inserted into a fastening apparatus 11. In this context, the textile semi-finished product 10 is preferably inserted in such a manner that a longitudinal side 12 extending in the longitudinal direction of the textile semi-finished product 10 rests against a reference or contact edge 15. The reference or contact edge 15 preferably runs in the longitudinal direction 9a of the semi-finished product 10. But it is also possible to envision multiple reference edges 15, for example, if the textile semi-finished product 10 has a longitudinal side or edge 12 the course of which is irregular. The fastening apparatus 11 comprises support metals 17 with a sewing window 18 extending in the longitudinal direction of the semi-finished product and a first support surface 19a located between the sewing window 18 and the reference edge 15 as well as a second support surface 19b arranged on the opposite side of the sewing window 18. Furthermore, the fastening apparatus 11 can be equipped with one or several clamping devices 16 that fix the semi-finished product 10 in place in its predetermined position. Preferably, the latter are arranged, either in sections or continuously, along the reference edge.

Figure 2:
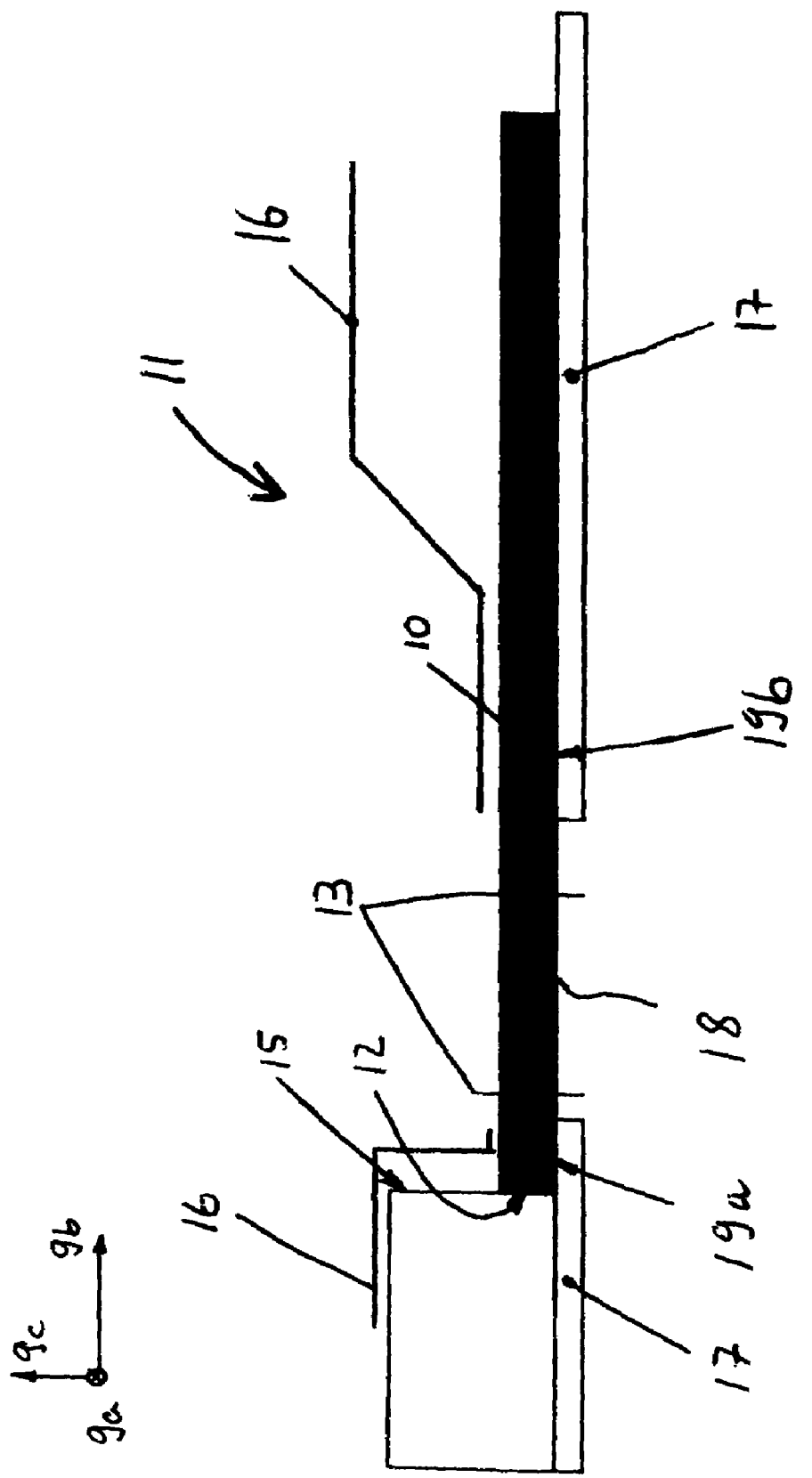
FIG. 2 is a schematic depiction of an example in an initial positioning and sewing direction for the mutual fixing in place of the layers of the textile semi-finished product in the flange or link area.

The clamping device 16 can also be designed differently than shown in FIG. 2. The essential aspect is that it satisfies a clamping function for the area of the preform. In particular, the clamping device 16 can be arranged as detachable on the fastening apparatus 11. For the subsequent steps, it is also possible to use a tension module 21 (FIG. 6a) that is suitable for use for the present purpose.

Inside the fastening apparatus 11, the layers of the semi-finished product 10 are sewn together in relation to each other, in particular, within the sewing window 18 in accordance with the prior art using a CNC-controlled double-lockstitch sewing machine and applying at least one seam 13.

In order to fashion a sub-preform or a preform 20 on the basis of the sewed up semi-finished product 10 that is already more similar to the end product and/or already approximates said end product and that will subsequently be referred to in an abbreviated form as (sub-)preform 20, it is possible to remove the sewed up semi-finished product from the fastening apparatus and fit it into a tension module 21. It is also possible to use the clamping device 16 for the next steps instead. Using the latter is especially advisable if no flange is to be fashioned on the preform. An alternative method provides that the tension module 21 is used in the fastening apparatus. In a preferred embodied example, the tension module 16 is comprised of a clamping rail 21a extending in the longitudinal direction 9a of the (sub-)preform 20, the longitudinal direction of which is designated with the reference symbol 22. The clamping rail 21a is also comprised of a contact edge or reference edge 23 in order to form a flange area 24; the corresponding side of the semi-finished product 10, preferably its longitudinal side 12, is applied to come to rest against that edge. In its capacity as a component of the tension module 21, the clamping rail 21a can comprise several holding devices 25 that are arranged along the longitudinal direction 22, preferably realized as clamping apparatuses or clamping jaws, which, in turn, are preferably arranged at regular distances relative to one another on a, preferably, flexible clamping rail, or they are arranged on a spring steel band 26. Preferably, the clamping apparatuses are attached to the spring steel band 26 by way of connecting elements or by way of glued connections. In this context, each holding device 25 can have a front surface 27 that is directed toward the area of the link 2 and a back surface 28. Both surfaces 27, 28 are moved relative to each other in order to accomplish a clamping action of the preform specifically by way of a mechanism (not described in more detail). The function of the holding devices 25 consists in holding the (sub-)preform and/or preform 20 in a desired position in relation to the contact edge 23.

The tension module 21 is envisioned to form a flange on the end of the preform 20 that is fixed in place by means of the holding devices 25, which is, as an example, in FIGS. 3a and 3b the end 1a. To achieve this, the sub-preform and/or preform 20 is turned up by a predetermined line in the longitudinal direction 22 and by a predetermined size of an angle, e.g. a 90 degree angle, in order to approximate the preform or the (sub-)preform 20 to the shape of the product that is to be manufactured, i.e. one of the shapes that are represented in the FIGS. 1a to 1e. The folding or edge line 31 of the flange that is to be formed, resulting due to the turning-up action of the edge, depends on the shape of the holding devices 25 crosswise in relation to the longitudinal direction 22. The latter extend to the edge line 31, thereby allowing the turning-up action 30 to be achieved by way of pressing the areas of the (sub-)preform 20, that rest against the clamping devices 25, to the e.g. area of the front surface 27 of the clamping device 25 that follows and is perpendicularly arranged in relation to the former.

The flange formation on a preform, which was described previously, is omitted if the product that is to be manufactured does not have a flange. Depending on the product to be manufactured, it is possible to envision fashioning a base instead.

Afterwards, the preform 20 is applied against a contact surface of a form element 41 in order to support the clamped edge area at the desired angle.

If the product that is to be manufactured is to be curved in a certain way in its longitudinal direction 9a, the tension module 21 is realized as flexible in the context of a step 40 or a draping process. The preferred embodied example of the tension module 21 with a clamping rail 21a provides that the latter is realized as flexible in its longitudinal direction 22, specifically as a spring steel band 26. In order to realize a curvature running in the longitudinal direction 22, the tension module 21 is brought to rest against a contact surface of a form element 41, which, in the present case, can be shaped as a modeling arc. The modeling arc 41 comprises a contact surface 42 that features a curvature along its longitudinal direction 42a corresponding to the predetermined curvature of the product that is to be manufactured (represented in a exemplary manner in FIG. 5a).

This step of applying an edge area of the preform to a contact surface of the form elements is also possible if no flange is envisioned, but if, for example, a base is envisioned in the edge area, that is located opposite to the clamped area. The latter is particularly advantageous in cases in which the goal consists in achieving a curvature in the longitudinal direction 22.

The form element 41, or also the modeling arc, is depicted schematically, for example, in FIG. 4 in order to show the state that applies when draping. In the embodiment represented, an additional support surface 55 is located below the form element 41 that is arranged at a certain angle relative to the contact surface 42 in order to achieve a supporting action at this angle and to prevent a slipping away of the (sub-)preform 20 from the desired angular position. In this context, the support surface 55 features a support surface 52a that is directed toward the preform 20 and upon which the end and/or starting piece of link 2 rests.

The state in which the clamping rail 21a is applied to a form element 41 in the shape of a modeling arc by way of the flexible spring steel band 26 is represented in FIGS. 5a and 5b. The clamping rail 21a can be fastened to the modeling arc utilizing fixing or fastening means or in a different way, e.g. by means of a gluing method. In the embodied example that is shown here, the fastening action is achieved by using the holding devices 25 directly on the surface 42 and/or by way of the spring steel metal 26 on the surface 42 with the surface that is directed away from the flange. The fastening action is reversible, for example, using a VELCRO (hook and loop) closure.

The curvature prescribed by the form element 41 requires that the sub-preform 20 is draped in the link area. Subsequently, the draped area must be fixed in place e.g. by way of sewing.

The preform 20 with the first edge area 1a and the second edge area 1b is inserted into a sewing frame or a sewing material holder 52 in order to fix the layers of the preform in place by way of sewing them up. The sewing frame 52 is realized in such a way that is able to receive the preform 20 at the location of a first edge area 1a along with the previously used fastening device and/or tension module 21.

Figure 6A:
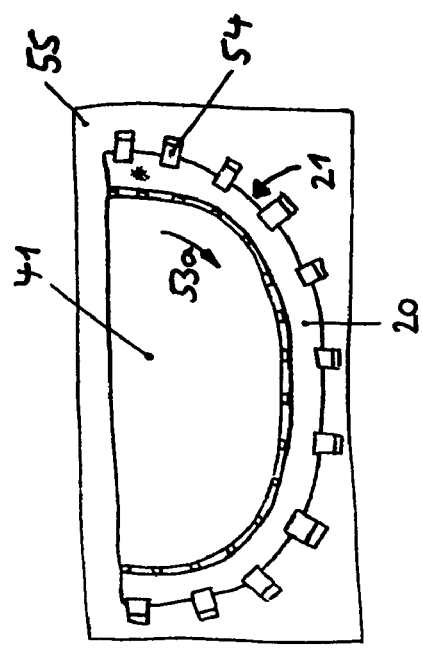
FIG. 6a is a top view of an example of a sewing frame into which a tension module has been inserted, including a holding device.
Figure 6B:
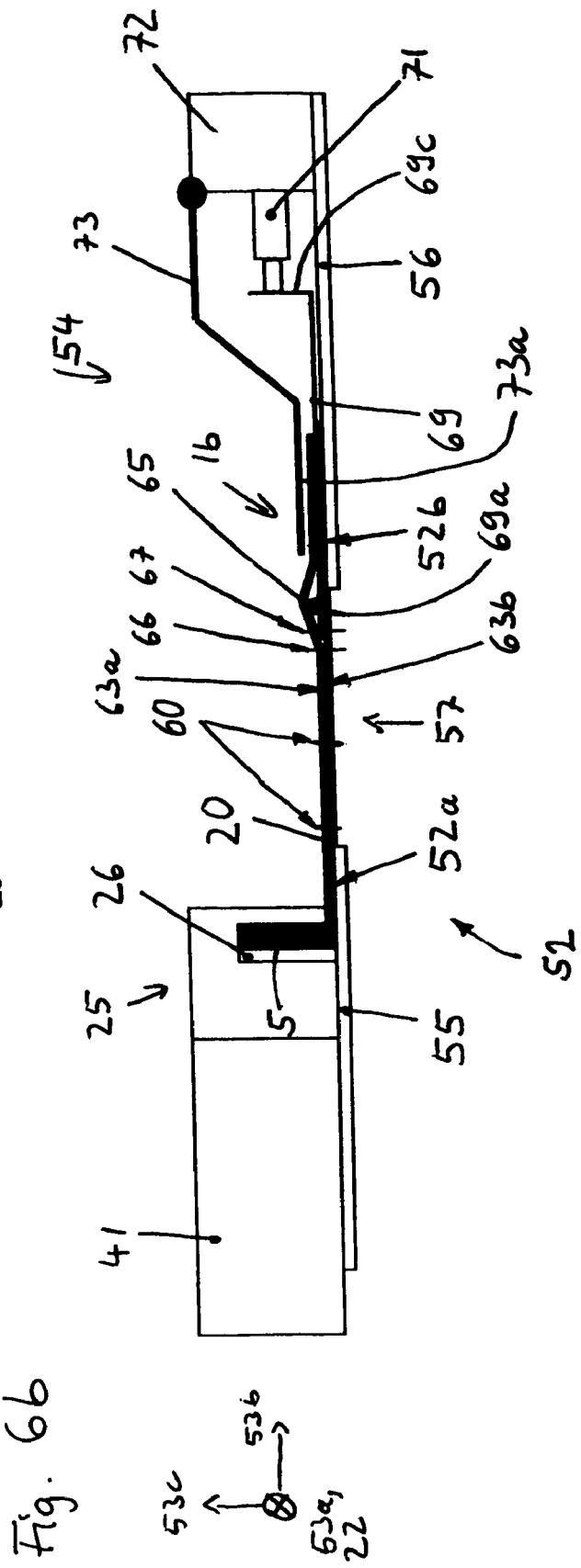
FIG. 6b is a section of a further example of a sewing frame into which the tension module has been inserted, including a holding device.

An example of the sewing frame 52 including a form element 41 with curved contact surface 42 (compare FIG. 4) is shown in FIG. 6b. A holding device 54 for fixing the edge area 1b in place that is arranged opposite to the flange area 3 is located opposite to the tension module 21. The holding device 54 that is envisioned, for example, on the sewing frame according to the invention can be realized in various ways, depending on the design form that the edge area 1b is to take. The example of the holding device 54 in FIG. 6b allows realizing a base 5 in the edge area 1b. Several holding devices 54 intended to realize the base or fix the link in place are arranged for that purpose along the curvature (refer to FIG. 6a).

In the depiction in accordance with FIGS. 6a and 6b the latter is inserted in conjunction with a tension module 21 including the clamping rail 21a and the modeling arc into a sewing frame 52 for the purpose of forming and sewing up the preforms 20 that are curved in a longitudinal direction and equipped with a flange 3. The construction of the apparatus depends on the accessibility of the sewing method that is to be employed.

The embodied example of a sewing frame 52 with several holding devices 54 that is depicted in FIG. 6b and is envisioned for use in connection with preforms that are curved in a longitudinal direction comprises a first support surface 55, that is identical with the contact surface or support surface 52a of the tension module 21 or that acts in conjunction with it and a second support surface 56 with a contact surface 52 b that is arranged in the second end area 1b. The longitudinal direction 53a for the preform 20 that is drawn in FIG. 6b corresponds to the longitudinal direction 9a in FIG. 1, the longitudinal direction 22 in FIGS. 3a–3b, and the direction 42a in FIG. 4. The holding devices are seen from the perspective of the longitudinal direction 42a and/or 53a and preferably arranged at even distances.

If the product that is to be manufactured is curved in its longitudinal direction 22, several holding devices 54 are arranged along a curved longitudinal direction 53a in FIG. 6a.

If, on the other hand, the product that is to be manufactured is equipped with a base and is not curved in its longitudinal direction 9a and/or 53a but linear, the clamping rail 21a is not to be applied to a curved contact surface 42 of the form element 41; the tension module 21 is instead realized as linear in its longitudinal direction. A step for realizing a base in an edge area of the non-curved preform 20 is implemented and is described in connection with FIG. 10a. A corresponding embodied example of the sewing frame 82 is represented in the FIGS. 10a and 10b.

In the alternative, both the sewing frame 52 and the sewing frame 82 can be realized in such a way that no holding devices 54 are arranged or possible to insert for the purpose of forming a base in the edge area 1b. Depending on the architecture of the preforms 20 that are to be fashioned, it is also possible to envision a tension module 21, a clamping device 16 or a different kind of clamping apparatus on the sewing frame 52 and/or the sewing frame 87 for holding or clamping the edge area 1b.

The extension of the sewing material holder or sewing frame 52 and/or 82 in its direction of width 53b is realized in such a way that, in this direction, the (sub-)preform 20 is circumgripped. The sewing frame 52 and/or 82 that is displayed in FIG. 6b and/or 10a can have its own, i.e. installed as stationary or integrated, form element 41 and clamping rail 21a including holding devices 25. Advantageously, however, the form element 41 and the holding devices 25 are arranged on the sewing frame 52 as exchangeable or with the ability to be inserted; and the form element is taken from one of the previous steps. This means that the sewing frame 52 is realized in such a way that it is possible to insert the tension module 21 with the (sub-)preform 20 and that it can be optionally fastened.

If no flange is to be realized in the edge area 1a of the preform 20, it is possible to envision that the tension module 21 or another clamping apparatus, e.g. the clamping device 16, be inserted in the sewing frame 52 and/or the sewing frame 82; and, in this instance, the clamped-in edge area 1a is, for example, not turned up but extends linearly.

The sewing frame 52 in accordance with FIG. 6b for curved, i.e. draped preforms 20, comprises at least one sewing window 57 that is arranged between the support surfaces 52a and 52b and extends in the longitudinal direction 22 and/or 42a. It is also possible to envision several windows 57 that are arranged along the longitudinal direction 53a. The sewing frame 52 including the windows 57 is used to fasten the (sub-)preform 20 in terms of its architecture in accordance with the steps 30 and/or step 40 inserting the seams 60. By applying at least one seam or a dense series of seams to the (sub-)preform 20, the link area 2 is fixed in terms of its shape in order to improve the properties of the building component for withstanding damage. When step 40 is implemented, the curvature of the (sub-)preform 20 is also fixed in place by way of several seams 60. The seams 60 are applied using sewing machines according to the state of the art, e.g. portal or robotic sewing machines (not shown). Incorporating the seams 60, which can be done partially or across planes, can also be achieved in such a manner that the seams improve the in-plane properties, i.e. the mechanical properties to withstand delamination and the properties to tolerate damage.

To realize a base 5 in the edge area 1b, a spacer or hollow space filler or, preferably, a gusset 65 (FIG. 8b) can be incorporated between the corresponding layers 63a, 63 b of the (sub-)preform 20, in particular in the longitudinal direction 42a which is in the longitudinal direction of the base or extending in accordance with the course of the fold. Preferably, this is done while the preform 20 is located inside the sewing frame or sewing material holder 52 and/or 82. A preferably envisioned gusset 65 is depicted in FIG. 8b. Depending on its application, it is also possible to design the spacer differently, in particular in terms of the shape of its cross section. An essential aspect is that the spacer can be inserted between the layers of the preform 20 and that it keeps the respective layers apart. Preferably, the spacer is realized in such a way that it is able to receive a fastening seam. The preferred cross section of the gusset 65 is approximately triangular (FIG. 8b), and it comprises a tip 65a, which is directed toward window 57 once the gusset 65 has been inserted in the (sub-)preform 20, as well as a blunt end 65b arranged opposite to the former end.

The axial ends 65c are arranged, preferably, in the area of the axial ends 1c and/or 1d of the (sub-)preform 20, provided the spacer or gusset 65 has been inserted into the latter. In order to achieve the corresponding positioning of the spacer or the gusset 65, a contact seam or contour seam 66 is applied to the (sub-)preform 20 at the location of the edge of the window 57 that is located in close proximity to the end area 1b. Afterwards, the gusset 65 can be pushed in the direction of the tension module 21 and/or the first edge area 1a of the (sub-)preform 20 until the tip 65a of the gusset 65 pointing in that direction makes approximate contact with the contour seam 66. In this context, the contour seam 66 defines the geometry of the base and/or the height of the link 2 and/or the edge line 91 (refer to FIGS. 1e and 7) of the base 5. Based on the selection of the contour seam 66, it is possible to realize variable link heights. If the (sub-)preform 20 is curved in the longitudinal direction 9a, i.e. if the clamping rail 21a is curved and applied to a form element 41, the gusset 65 is advantageously positioned by way of applying a minimal tensile force on the spacer or gusset 65, at its lengthwise ends 65c (not shown here). It is possible to envision a mechanism for the purpose of applying counteracting tensile force in the longitudinal direction. Due to the curvature of the gusset 65, said gusset is thus pulled in the direction of the contact seam or contour seam. The gusset 65 is afterwards fixed in place within the corresponding layers of the (sub-)preform 20 by way of inserting a fastening seam 67 that runs parallel relative to the contour seam 66. The fastening seam 67 is preferably arranged in the area of the tip 65*a* of the gusset 65. To insert the gusset, the second end area 1*b*, for which the realization of the base 5 is envisioned, is folded open, and the corresponding layer and/or corresponding layers of the (sub-)preform 20 are lifted off the remaining layers of the (sub-)preform 20.

In further steps, a sewing process is carried out in order to fix the layers or the draped link areas into place and, if necessary, those of other areas of the preform 20. Corresponding areas of layers are subsequently folded apart in opposite directions in order to realize a base 5. If required, depending on a case by case basis, these areas are equipped with stiffening elements in order to achieve a mechanical stabilization of the base.

For purposes of equalizing an uneven course of the contour in the second end area or in the base area 1*b*, the holding device 54 is preferably realized to include a press-on means intended to press the spacer 65 against the contact seam 66. It is preferred that the press-on means is comprised of at least one push metal 69 with an impact surface 69*a*, which pushes, utilizing an adjustment mechanism 72, the gusset 65 against the gusset contact seam or the contour seam 66, thereby ensuring the positioning of the latter. In the longitudinal direction 53*a*, push metals 69 are to be envisioned, preferably, especially in those places where the height of the link 2 is locally reduced, which means that a contact of the gusset 65 with the gusset contact seam 66 is not guaranteed in these locations. Each push metal 69 is equipped with an impact surface 69*a* that rests against the blunt end 65*b* of the gusset 65, which is why the push metal is preferably arranged at an angle in relation to the contact surface 52*b*. An end piece 69*c* of the push metal 69, that is located in the edge area, is shaped in such a way that it allows for the engagement of a tension element 71 of the holding device 54 in order to press the push metal 69 along with the gusset 65 against the contour seam 66. A mechanism 72 according to the state of the art (not shown here) is connected to the tension element 71; and it maintains the pushing movement of the push metal 69 and its holding action in the final position when the gusset 65 rests against the contour seam 66. The holding device 54 is further comprised of the suppression metal 73, for example, a metal block with the hinge for folding down the suppression metal, preferably arranged on the mechanism 72. The suppression metal 73 is positioned in such a way that a corresponding surface 73*a* of the second end area 1*b* of the (sub-)preform 20 presses against the support surface 52*b* of the support surface 56. The purpose of the suppression metal is to fix the preform 20 in place so it can withstand the forces that are generated during the sewing process.

FIG. 10*a* represents the step for realizing a base 5, for instance, when the product that is to be manufactured is not curved in its longitudinal direction 9*a* and the draping process is, therefore, omitted. The sewing frame or sewing material holder 82 is correspondingly designed as linear in its longitudinal direction 53*a*. A section of sewing frame 82 and an embodied example of holding device 54 including a suppression metal 83 is shown in FIG. 10*a* and, in this case shown there, the preform features a flange in the edge area. The seam 66 is as depicted as in FIG. 6*b*. Moreover, the sewing frame 82 that is depicted is also comprised of at least one window or sewing window 87; this is the area where the seams 60 are inserted into the (sub-)preform 20 that is placed onto sewing frame 82 in order to fix the layers of (sub-)preform 20 in place. The sewing frame 82 has a first edge area 82*a* that rests against the tension module 21 as well as a second edge area 82*b*. The contour seam 66 determines the contour of the link 2 and/or the course of the base of the profile that is to be produced or of the edge lines of the latter, because it corresponds approximately to said course that the base areas follow when extend away from the link area.

The spacer or gusset 65 is introduced between two layers. To press the spacer or gusset 65 against the contour seam 66, the second end area or base area 1*b* of the (sub-)preform is separated by layers, as shown schematically in FIG. 10*a*. The edge areas of two textile layers 63*a*, 63*b* are folded apart in opposite directions vis-á-vis each other during this process. Due to the lack of a curvature in the longitudinal direction, it is advantageous to apply a tensile force to the spacer or gusset 65 in order to guide it close enough to the contour seam 66. To insure the exact positioning of the gusset, it is, furthermore, possible to envision a press-on means used to move and fix the spacer in place and to integrate it with the holding device. The example shown in FIG. 10*a* provides for using a needle bar 88 with needles 88*a* that can be moved by way of the adjustment mechanism 74 and for a feed means that is realized as a comb metal 89 including portion 89*b*. The spacer or gusset 65 is placed on the needle bar 88, which is guided by way of the comb metal 89, and fixed in place utilizing the needles 88*a* of the needle bar 88 (FIG. 10*b*). The blunt surface 65*b* of the gusset that is envisioned rests, if necessary, correspondingly against the surface 89*c* of the comb metal 89. Several needle bars 88 can be envisioned along the lengthwise extension 53*a* of the holding device 54 in order to modify the widths with regard to the link areas. The needle bar 88 holds the gusset 65 in its longitudinal direction in a predetermined and, in particular, linear form. The comb metal 89 pushes against the gusset 65, the shape of which is maintained by the needle bar 88, thereby pressing it against the contour seam 66. The gusset can then be fixed in place utilizing a fastening seam 67; however, to prevent collisions between the needles 88*a* of the needle bar 88 with the sewing needle of the sewing machine, it is necessary that the needle bar 88 be moved in the direction of the width. Due to the pressure applied by the comb metal 89 and the textile layers 63 *a* and 63 *b* of the base area, the gusset 65 is sufficiently fixed in place.

If, for example, the goal consisted in producing profiles as shown in FIG. 1*b* and FIG. 1*e*, it is necessary to shape the base area in the context of a further method step 60 and to fix the free edge areas or base areas of the respective layers in place. Advantageously, additional stiffening layers or a stiffening element 91 (FIG. 8*a*) are incorporated in the base area 5.

For the stiffening of base area 1*b*, irrespective of whether there is a curve in the longitudinal direction or not, the tension module 21 is brought into a corresponding position that allows free access to base area 1*b* in order to realize a base 5. For this purpose, the tension module 21 is removed from the sewing frame 52. The link area 2 of the (sub-)preform 20 is supported by the support elements 93 (FIG. 7), i.e. it is maintained as a plane architecture in its predetermined form. Simultaneously, the support elements 93 serve as assembly aids for the, at least one, stiffening element 91.

The free ends or edge areas of the bases can be arranged at any desired angle relative to one another or with regard to the link area; and they can be stiffened, for example, by employing stiffening elements.

The envisioned stiffening layers 91 are advantageously comprised of several layers featuring a regular or constant course of the edge contour. Used as starting materials are, for example, multi-axial clutches and narrow-wide fabrics 91a that are adjusted to the required architecture of the base 5 of the profile that is to be manufactured. The components of the stiffening layers are preferably connected to one another by way of sewing or gluing, using thermoplastic fibrous web material or using thermoplastic yarns that are already part of the fabric and that are melted together.

When sewing, all blanks of the stiffening layers 91a are positioned in the sewing apparatus or a sewing frame and combined by way of one or multiple seams. If bonding agents are used, the blanks of fabrics 91a and/or clutches 91b are positioned on a substrate (FIG. 9). In this context, it is possible to apply, in addition, a thermoplastic fibrous web 91c, following piling, on top of the stiffening layers 91a and 91b. The stiffening layers are subsequently exposed to heat and pressure, resulting in the melting of the thermoplastic material. After cool-down, all layers 91a are glued together. The thermoplastic fibrous web 91c is used as a fastening material for the assembly of the layers or fabrics 91a, which are sewn together, in the base area 1 of the (sub-)preform 20.

The at least one stiffening element 91 is positioned in the base 5, in particular, in such a way that the free ends of the base area that are folded apart by layers form, in conjunction with the link area 2, a base of a predetermined architecture. Depending on the respective application, the latter can point away from the link at any desired angle, e.g. at a right angle. The at least one stiffening element 91 is placed onto the end area, which is formed by the free ends, and is preferably glued together by way of a thermal treatment or mechanically sewn together. In order to position the stiffening layers for subsequent steps in the base area 5, said stiffening layers are held by means of a positioning metal 94. The execution of the positioning metal 94 depends on the type of the assembly. If the at least one stiffening element 91 is equipped with a fibrous web 91c, the latter is melted during a heating process and utilized for combining the components. Therefore, the fibrous web should be arranged in the assembly area of the base 5.

The preform is removed from the tension module 21 after the stiffening elements 91 have been installed. For further processing, the preform is positioned inside an infiltration tool and wetted with resin in accordance with methods that are known in the art. In this context, it is possible to envision the previously described apparatuses or other support elements for supporting the areas of the preform.

The invention claimed is:

1. A process for manufacturing a fiber-reinforced plastic building component comprised of a link and at least one base that extends linearly in a longitudinal direction using textile blanks as starting material comprising:

positioning, clamping in, and initially sewing-up at least two layers of textile blanks in order to fix the layers into place relative to one another and realize a preform, and infiltrating the preform with resin in order to manufacture the plastic building component, wherein, following initially sewing-up the at least two layers of textile blanks, a contour seam is inserted along an end area of the preform, the end area is turned up at a predetermined angle in order to realize a course of the at least one base that is to be created, a gusset extending in a longitudinal direction of the contour seam is inserted between the at least two layers, and the at least two layers are sewed up in at least one sewing window in a sewing material holder, and wherein the end area is fixed in place by way of stiffening elements.

2. The process as claimed in claim 1 wherein a fastening seam is inserted in the at least two layers in order to fix the gusset in place.

3. The process as claimed in claim 1 wherein the gusset is pressed against the contour seam by way of a pressing element.

4. The process as claimed in claim 2 wherein the gusset is pressed against the contour seam by way of a pressing element.

5. The process as claimed in claim 1 wherein a flange is realized on another end area by clamping in and turning up the other end area extending in the longitudinal direction of the at least two layers by a predetermined angle, the turned up edge area is applied against a linearly extending contact area of a form element, and the link is fixed in place relative to the turned up edge area inside the sewing material holder.

6. The process as claimed in claim 2 wherein a flange is realized on another end area by clamping in and turning up the other end area extending in the longitudinal direction of the at least two layers by a predetermined angle, the turned up edge area is applied against a linearly extending contact area of a form element, and the link is fixed in place relative to the turned up edge area inside the sewing material holder.

7. The process as claimed in claim 3 wherein a flange is realized on another end area by clamping in and turning up the other end area extending in the longitudinal direction of the at least two layers by a predetermined angle, the turned up edge area is applied against a linearly extending contact area of a form element, and the link is fixed in place relative to the turned up edge area inside the sewing material holder.

* * * * *